United States Patent [19]
Tabata et al.

[11] Patent Number: 5,357,099
[45] Date of Patent: Oct. 18, 1994

[54] CONTACT TYPE IMAGE SENSOR HAVING ORIGINAL SUPPORT MEMBER WITH A REFLECTING SURFACE

[75] Inventors: Masami Tabata, Isehara; Takahiro Kaihotsu, Fujisawa; Nobuyoshi Tanaka, Tokyo, all of Japan

[73] Assignee: Canon Kabushiki Kaisha, Tokyo, Japan

[21] Appl. No.: 145,234

[22] Filed: Nov. 3, 1993

[30] Foreign Application Priority Data

Nov. 4, 1992 [JP] Japan ................... 4-318015
Apr. 9, 1993 [JP] Japan ................... 5-105984

[51] Int. Cl.⁵ .................... H01J 40/14; H01L 27/14
[52] U.S. Cl. ..................... 250/208.1; 358/475
[58] Field of Search .............. 250/208.1, 216, 578.1; 358/474, 475, 482, 483

[56] References Cited

U.S. PATENT DOCUMENTS

| | | | |
|---|---|---|---|
| 5,130,761 | 7/1992 | Tanaka | 355/67 |
| 5,182,445 | 1/1993 | Yamashita | 250/208.1 |
| 5,187,595 | 2/1993 | Kitani et al. | 358/482 |
| 5,196,950 | 3/1993 | Fukoka et al. | 358/475 |
| 5,283,425 | 2/1994 | Imamura | 250/208.1 |

FOREIGN PATENT DOCUMENTS

| | | |
|---|---|---|
| 0457623 | 11/1991 | European Pat. Off. |
| 0465768 | 1/1992 | European Pat. Off. |
| 8906063 | 8/1989 | Fed. Rep. of Germany |
| 58-143665 | 8/1983 | Japan |
| 58-40972 | 10/1983 | Japan |

Primary Examiner—David C. Nelms
Assistant Examiner—Stephone B. Allen
Attorney, Agent, or Firm—Fitzpatrick, Cella, Harper & Scinto

[57] ABSTRACT

A contact type image sensor comprises: a light source to emit a light with a predetermined inclination angle for the direction of the normal line of the surface of an original at the position of a read line in order to irradiate the light from both sides to the read line by one light source; an original supporting member to support the original in order to lead the light from the light source to the read line; and a photoelectric converting device section to receive the light from the original surface. At least a part of the original supporting member locating on the side opposite to the arrangement side of the light source with respect to the read line has a reflecting surface for reflecting a part of the light from the light source and leading to the read line.

8 Claims, 7 Drawing Sheets

CONTACT TYPE IMAGE SENSOR HAVING ORIGINAL SUPPORT MEMBER WITH A REFLECTING SURFACE

BACKGROUND OF THE INVENTION

1. Field of the Invention

The present invention relates to a contact type image sensor and, more particularly, to a contact type image sensor comprising a light source for emitting the light with a predetermined inclination angle in the direction of a normal line of the surface of an original locating at the position of a read line, an original supporting member for leading the light from the light source to the read line and for supporting the original; and a photoelectric converting device section to receive the light from the original surface.

2. Related Background Art

An example of a construction of a conventional contact type image sensor will now be described hereinbelow.

FIG. 1 is a plan view showing an example of a construction of the conventional contact type image sensor. FIG. 2 is a cross sectional view of FIG. 1. As shown in FIGS. 1 and 2, the contact type image sensor of the constructional example comprises: an LED array 3 in which a plurality of LED devices 2 to irradiate lights to an original 8 are arranged in correspondence to an original read line 9 of the upper surface of a cover glass 6 as an original supporting member so as to have a length corresponding to a width of original 8 to be read; a lens array 1 to lead the reflected lights from the original 8; a sensor array 5 which is constructed by arranging photoelectric converting devices 4 for receiving the lights led by the lens array 1 and for converting into the electric signals; and a frame body 7 to position the above component elements.

However, in case of reading an original having concave and convex surfaces such that a plurality of original papers are adhered onto a base paper, if the LED array 3 as a light source is merely arranged for the read line 9 so as to have a predetermined angle from one side like the contact type image sensor of the above conventional constructional example, shadows are formed on the original 8 by the convex portions and the sensor array 5 reads such shadows, so that the shadows eventually appear as lateral lines on an output image.

To avoid such a phenomenon, a contact type image sensor with a constructional example as shown in FIG. 3 is used as a sensor to read the original having concave and convex portions. According to the contact type image sensor of the present constructional example, by symmetrically arranging the LED arrays 3 and 3' on both sides for the read line 9 with respect to the left and right, the occurrence of the shadows is prevented.

In the contact type image sensor of the constructional example shown in FIG. 3, since two LED arrays are necessary and the costs are high. Therefore, a contact type image sensor with a constructional example as shown in FIG. 4 has been proposed. As shown in FIG. 4, according to the contact type image sensor of the constructional example, the LED array 3' in FIG. 3 is eliminated and a mirror 10 is arranged at the position corresponding to the LED array 3', the reflected light from the original by the LED array 3 is received, and the reflected light is reflected and is again returned to the original, thereby obtaining an effect similar to that in case of the construction of FIG. 3 and reducing the costs.

In the contact type image sensor of the constructional example shown in FIG. 3, however, since it is necessary to keep two spaces enough to enclose the light sources, a long optical path length is needed and the size is large. As compared with the reduction type, a compactness as one of large advantages of the contact type is largely obstructed. The necessity of two light sources becomes a cause of an increase in costs.

According to the contact type image sensor with the constructional example shown in FIG. 4, on the other hand, since the reflected light amount of the mirror 10 depends on the reflected light amount of the original, the reflected light amount of the mirror is largely fluctuated due to a reflection density of the original. Particularly, in case of reading the original of a large density, the reflected light amount is small and an enough effect cannot be obtained.

SUMMARY OF THE INVENTION

By paying an attention to the problems in the conventional systems as mentioned above, it is an object of the invention to solve the above problems and to provide a contact type image sensor in which the occurrence of shadows of an original having concave and convex portions is prevented and, further, an illuminance of a read line of the original can be raised without increasing the size and costs of the contact type image sensor and which can correspond to a sensor of a high speed and a high resolution.

According to an embodiment of the invention to accomplish the above object, there is provided a contact type image sensor comprising: a light source to emit a light with a predetermined inclination angle for the direction of a normal line of the surface of an original locating at the position of a read line; an original supporting member for leading the light from the light source to the read line and for supporting the original; and a photoelectric converting device section to receive the light from the original surface, wherein at least a part of the original supporting member on the side opposite to the arrangement side of the light source with respect to the read line has a reflecting surface for reflecting a part of the light from the light source and leading to the read line.

According to the invention, at least a part of the original supporting member locating on the side opposite to the arrangement side of the light source with respect to the read line has the reflecting surface for reflecting a part of the light from the light source and leading to the read line, thereby enabling the light source to irradiate the light from both sides to the read line.

According to another embodiment of the invention, there is provided a contact type image sensor comprising: a light source to emit the light to illuminate an original; an original supporting member for allowing the light from the light source to be transmitted and for supporting the original; and a photosensor for converting optical information of the original on the read line of the original supporting member into the electric signal, wherein at least a part of the original supporting member on the side opposite to the arrangement side of the light source with respect to the read line has a reflecting surface for reflecting a part of the light irradiated from the light source and for leading to the read line, and an optical axis of the illumination light from the light source is located between the read line and the reflecting surface or onto the reflecting surface.

According to still another embodiment of the invention, there is provided a contact type image sensor comprising: a light source to emit a light to illuminate an original; an original supporting member for allowing the light from the light source to be transmitted and for supporting the original; and a photosensor for converting optical information of the original on the read line of the original supporting member into an electric signal, wherein at least a part of the original supporting member on the side opposite to the arrangement side of the light source with respect to the read line has a reflecting surface for reflecting a part of the light irradiated from the light source and for leading to the read line, and as a light source, there is used a light source having directing characteristics such that the illuminance of the original surface at the read line position by the light that is directly irradiated from the light source is equal to the illuminance of the original surface at the read line position by the light which is reflected by the reflecting surface and is irradiated.

Consequently, in the case where at least a part of the original supporting member locating on the side opposite to the arrangement side of the light source with respect to the read line is equipped with the reflecting surface for reflecting a part of the light irradiated from the light source and for leading to the read line and the contact type image sensor is constructed, the optical axis of the illumination light from the light source is positioned between the read line and the reflecting surface or onto the reflecting surface, so that the illuminance on the original surface at the read line position by the light that is directly irradiated from the light source is the same as the illuminance on the original surface at the read line position by the light that is reflected by the reflecting surface and is irradiated.

According to further another embodiment of the invention, in the case where at least a part of the original supporting member locating on the side opposite to the arrangement side of the light source with respect to the read line is equipped with the reflecting surface for reflecting a part of the light irradiated from the light source and for leading to the read line, and a contact type image sensor is constructed, the illuminance on the original surface at the read line position by the light that is directly irradiated from the light source is equalized to the illuminance on the original surface at the read line position by the light that is reflected by the reflecting surface and is irradiated by using the light source having gentle directing characteristics.

DETAILED DESCRIPTION OF THE PREFERRED EMBODIMENTS

Figure 5:
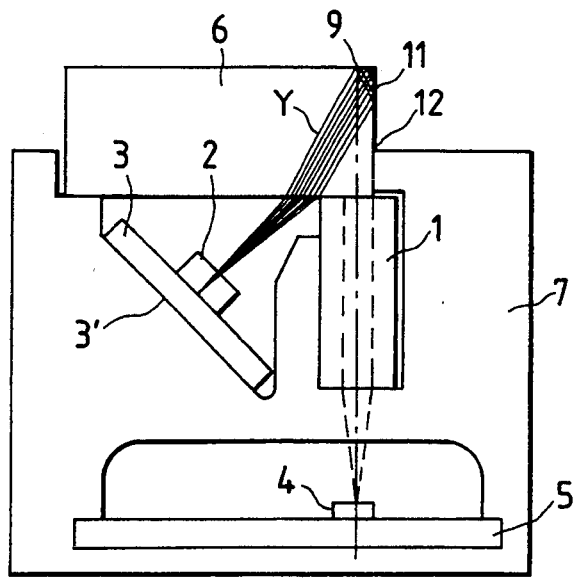
FIG. 5 is a cross sectional view of a contact type image sensor of the first embodiment of the invention.

FIG. 5 is a cross sectional view showing a contact type image sensor of the first embodiment according to the invention. In FIG. 5, the same compoent elements as those shown in FIGS. 1 to 4 are designated by the same reference numerals.

In FIG. 5, reference numeral 5 denotes the sensor array which is constructed by arranging a plurality of photoelectric converting devices 4 in correspondence to the width of original. The sensor array 5 is arranged in an elongated space of the frame body 7. The lens array 1 is arranged in a groove of the frame body 7 just above the photoelectric converting devices 4. The LED array 3 which is constructed by arranging a plurality of LED devices 2 is arranged as a light source onto a slant surface 3' having an inclination angle of 45° formed on the frame body 7. The cover glass 6 for supporting the original is arranged on the upper surface of the frame body 7 and lens array 1. To precisely position the cover glass 7, a cover glass confronting surface 12 is provided for the frame body 6.

In the embodiment, the LED array 3 is arranged on one side and a side surface 11 of the cover glass 6 is arranged on the opposite side at the position close to the read line 9 so as to sandwich the original read line 9 of the cover glass 6. The side surface 11 is used as a reflecting surface for reflecting a part of the light of the LED array 3 as a light source and for leading the light from the direction opposite to the light source to the read line 9.

In the embodiment, since a blue plate glass (refractive index $n_2 = 1.51$) is used as a cover glass 6, a critical angle $\theta_h$ of the side surface 11 serving as a reflecting surface of the cover glass 6 is equal to $\theta_h \approx 41$ due to a difference between the refractive index $n_2$ and a refractive index ($n_1 = 1$) of the air. Since the light source is arranged on the surface of 45° of the frame body 7, the light from the light source is totally reflected because its angle exceeds the critical angle.

The reflecting surface of the cover glass 6 is worked by an ordinary cheap glass cutting working technique such that the surface is scratched by a diamond cutter and is cut out or by using a dicing saw, processing by a razor, or the like. In case of using such a reflecting surface of the cover glass 6, the illuminance on the original read line 9 is increased by 1.5 times or more and enough effect is obtained as a reflecting surface. In case of further increasing the light amount, by forming a mirror surface by polishing the side surface 11 or by evaporation depositing aluminum onto the surface or the like, the scattering of the light is prevented and the illuminance on the original read line can be raised by a value near 2.0 times.

Figure 6:
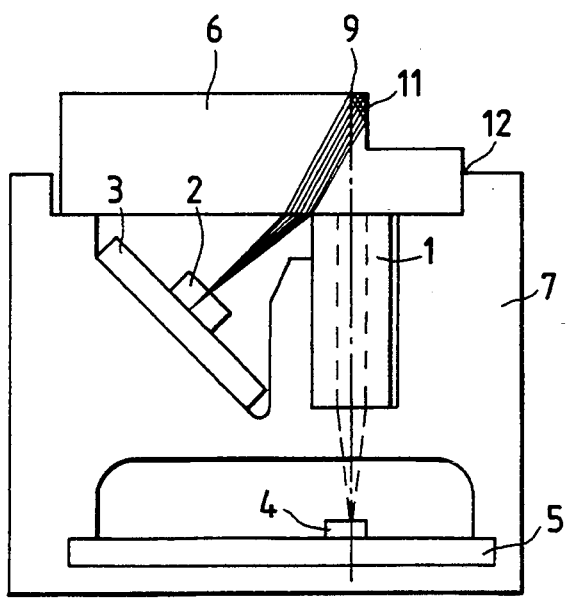
FIG. 6 is a cross sectional view of the contact type image sensor according to the first embodiment of the invention.

As a shape of the cover glass 6, a stairway-like shape can be formed as shown in the second embodiment of FIG. 6 or a groove can be also formed.

In the embodiment, the cover glass is made thick and is closely adhered to the lens array 1 in order to enable the cover glass to be easily attached. However, as shown in the conventional example in FIG. 2, a similar effect can be also similarly obtained even by a structure such that the lens array 1 is away from the cover glass 6.

In the embodiment, although the LED array has been used as a light source, it is also possible to use another light source such as fluorescent lamp, a xenon lamp, EL light source, or the like.

A contact type image sensor of the third embodiment of the invention will now be described.

Figure 7:
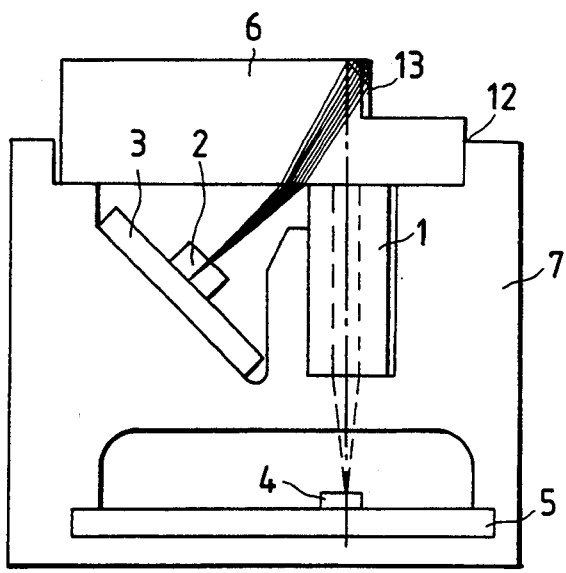
FIG. 7 is a cross sectional view of a contact type image sensor of the second embodiment of the invention.

FIG. 7 is a cross sectional view showing the contact type image sensor of the third embodiment of the invention. Even in the above first embodiment, the LED array 3 in which the LED devices 2 as point light sources are discretely arranged in a line has been used as a light source. However, in case of using the LED array 3, a fluctuation occurs in the illuminance on the original surface due to a ripple corresponding to the interval between the LED chips and there is a case where such an illuminance fluctuation appears as an output image. The illuminance fluctuation is further enhanced when the side surface 11 as a reflecting surface is provided for the cover glass.

In the embodiment, therefore, by setting the side surface as a reflecting surface to a scattering surface 13, the illuminance fluctuation due to the ripple of the point light source in case of using a point light source array is reduced. The scattering surface can be obtained by a simple working method such that convex and concave surfaces are formed by a sand blast or chemical process or a scattering paint is coated or the like.

FIGS. 8 to 12 show constructional examples of the fourth to eighth embodiments of the shapes of the cover glasses as original supporting members in the first and second embodiments described above.

Figure 8:
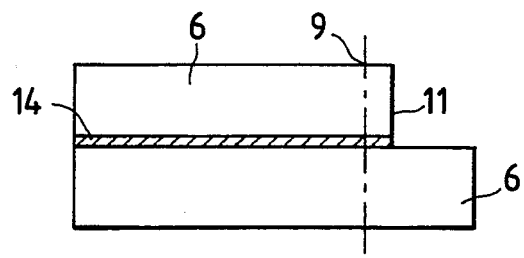
FIG. 8 is a cross sectional view showing another constructional example of an original supporting member shape.

FIG. 8 shows the fourth embodiment in which the original supporting member is divided into two portions and they are adhered by an adhesive agent 14 in order to enable the side surface 11 as a reflecting surface in FIG. 6 to be easily polished. Those two portions of the original supporting member can be also overlaid and fixed to the frame body 7, respectively, without using the adhesive agent 14.

Figure 9:
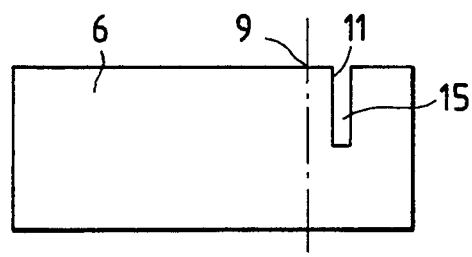
FIG. 9 is a cross sectional view showing still another constructional example of an original supporting member shape.

FIG. 9 shows the fifth embodiment in which the reflecting surface is provided by forming a groove onto the original supporting member by a dicing saw or the like. In the diagram, reference numeral 15 denotes a groove formed. One side surface 11 of the groove 15 is used as a reflecting surface.

Figure 10:
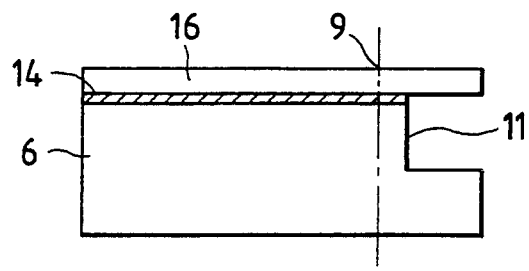
FIG. 10 is a cross sectional view showing still another constructional example of an original supporting member shape.
Figure 11:
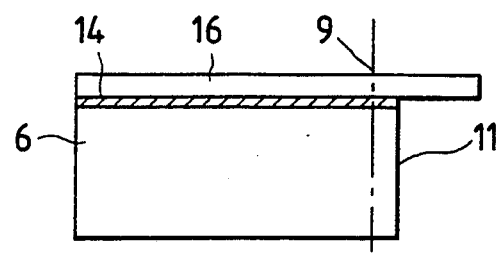
FIG. 11 is a cross sectional view showing still another constructional example of an original supporting member shape.

FIGS. 10 and 11 show the sixth and seventh embodiments in which a light transparency plate member 16 is adhered onto the original supporting member through an adhesive agent in order to smoothly pass the original without any click. The shapes of the cover glasses in FIGS. 10 and 11 correspond to the shapes of the cover glasses in FIGS. 6 and 5.

Figure 12:
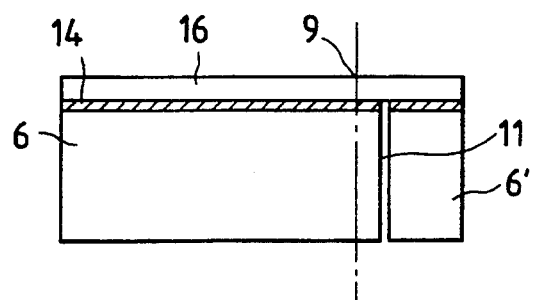
FIG. 12 is a cross sectional view showing still another constructional example of an original supporting member shape.

As shown in the eighth embodiment of FIG. 12, it is also possible to construct in a manner such that the edge surface of the cover glass 6 is located near (right side in FIG. 5) of the read line 9 and, further, a cover glass 6' which is come into contact with the edge surface and has the same thickness as that of the edge surface can be also arranged. By using such a structure, a hooking of the original can be eliminated. In this case, by providing a slight air layer, a coating scattering surface, or the like into the portion between the cover glasses 6 and 6', the foregoing reflecting surface of scattering surface can be formed.

According to the above embodiments of the invention described above, at least a part of the original supporting member locating on the side opposite to the arrangement side of the light source with respect to the read line is equipped with the reflecting surface or diffusing surface for reflecting a part of the light from the light source and for leading to the read line, so that the light can be irradiated from both sides to the read line by one light source.

Particularly, by setting the reflecting surface to a total reflection angle for the light of the light source or to the mirror surface, it is possible to obtain a predetermined illuminance irrespective of the reflection density of the original and the characteristics such that the shadows of the original having concave and convex portions like an original such that papers are adhered onto a base paper which are almost similar to those in case of the conventional contact type image sensor in which the light sources are provided on both sides so as to sandwich the read line. In addition, the size and costs can be also reduced.

Since the illuminance rises, the invention can also correspond to the contact type image sensor which can read an original image at a high speed and a high resolution.

Particularly, in case of using the point light source array as a light source, by setting the reflecting surface into a scattering surface, the illuminance fluctuation corresponding to the ripple of the point light source can be reduced.

The ninth embodiment of the invention will now be described in detail hereinbelow with reference to the drawings.

Figure 13:
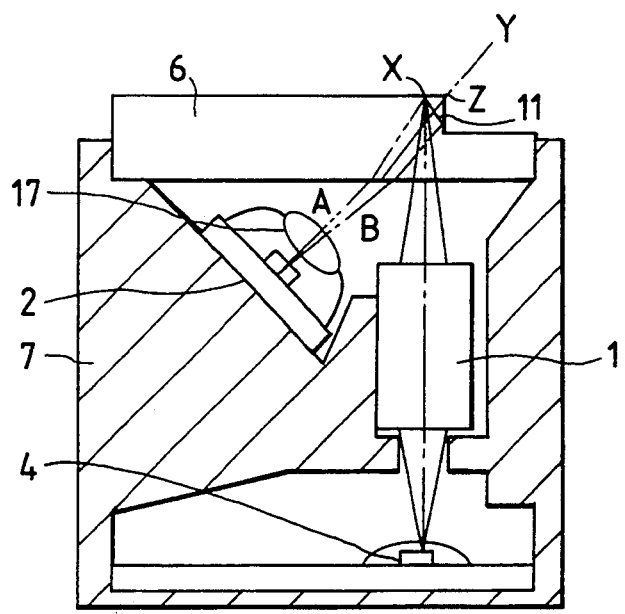
FIG. 13 is a cross sectional view showing the ninth embodiment of a contact type image sensor of the invention.

FIG. 13 is a cross sectional view of the ninth embodiment of the contact type image sensor of the invention and shows the typical feature of the invention. In the diagram, the same component elements as those shown in FIGS. 1 to 12 are designated by the same reference numerals. Reference numeral 17 denotes a lens to adjust the position of an optical axis Y of the illumination light from the LED array 2.

The light irradiated from the LED array 2 passes along optical paths A and B in FIG. 13 and reaches a reading position X. In the embodiment, in order to minimize the influence by the shadows which are formed around the concave and convex portions of the original at the reading position X, the illuminance on the original surface by the direct irradiation light at the reading position X and the illuminance on the original surface by the reflected light from the reflecting surface is set to 1:1.

Figure 14:
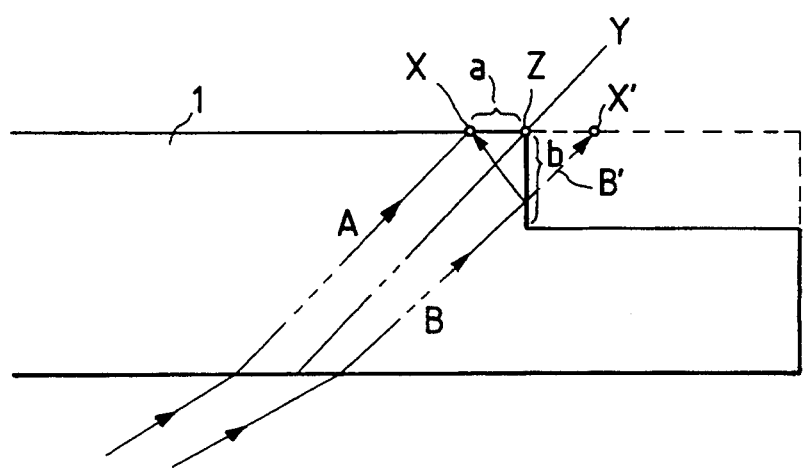
FIG. 14 is a partial enlarged diagram of FIG. 13 showing optical paths of A and B and a virtual optical path B'.
Figure 15:
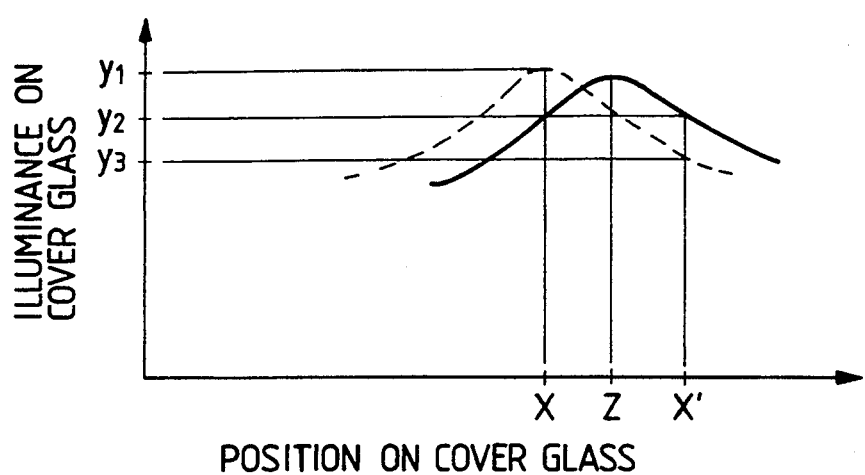
FIG. 15 is a diagram for explaining an illuminance distribution on a cover glass.

For easy understanding, a consideration will now be made with respect to the case where the light is not reflected by the reflecting surface but is transmitted as it is. FIG. 14 is a partial enlarged diagram of FIG. 13 showing the optical paths A and B and a virtual optical path B'. FIG. 15 is a graph showing an illumination distribution on the original supporting member in the case where the system doesn't have reflecting surface. B' denotes the virtual optical axis in case of no reflecting surface and X' indicates a virtual reading position. It is assumed that the illuminance at the virtual reading position X' is equal to the illuminance at the reading position X by the light which has reached by the optical path B.

Now, assuming that the optical axis Y of the illumination light from the LED array 2 passes through the reading position X on the cover glass 6, the illuminance distribution is as shown by a broken line in FIG. 15. The illuminance on the reading position X is set to $Y_1$, the illuminance on the virtual reading position X' is set to $Y_3$, and $Y_1$ is larger than $Y_3$. That is, the illuminance at the reading position X due to the light which reaches the reading position X from the optical path A differs from the illuminance at the reading position X by the light which reaches the reading position X from the optical path B.

According to the embodiment, however, as shown in FIG. 14, by deviating the optical axis Y of the illumination light from the LED device 2 from the reading position X and arranging at a position Z on the reflecting surface, the illuminance distribution on the original supporting member can be set to a distribution as shown by a solid line in FIG. 15. In this case, both of the illuminance at the reading position X and the illuminance at the virtual reading position X' are equal to $Y_2$. That is, the illuminance on the reading position X by the light which reaches the reading position X from the optical path A is equal to the illuminance on the reading position X by the light which reaches the reading position X from the optical path B.

As mentioned above, by deviating the maximum value of the illuminance distribution on the original supporting member to a position between the points X and X', the amount of light which passes along the optical path A and reaches the original reading position X can be almost equalized to the amount of light which passes along the optical path B and reaches the original reading position X. The illuminance on the original surface by the direct irradiation light at the reading position X and the illuminance on the original surface by the reflected light from the reflecting surface are set to almost 1:1.

In the embodiment, the lens 17 has been used to adjust the optical axis Y. However, the optical axis Y can be also adjusted by changing the attaching angle of the substrate of the LED array or a package shape of the LED chip.

In the embodiment, although the optical axis Y has been arranged to the position (position Z in the diagram) on the reflecting surface, the invention is not limited to such a position. It is sufficient to arrange the optical axis Y to a proper position (region a in the diagram) between the reading position X and the reflecting surface or on the reflecting surface (region b in the diagram) in accordance with the directing characteristics of the LED array, a refractive index of the reflecting surface, or the like.

It is also possible to use an LED array having gentle directing characteristics so as not to cause an illuminance difference due to the difference between the optical paths.

Figure 16:
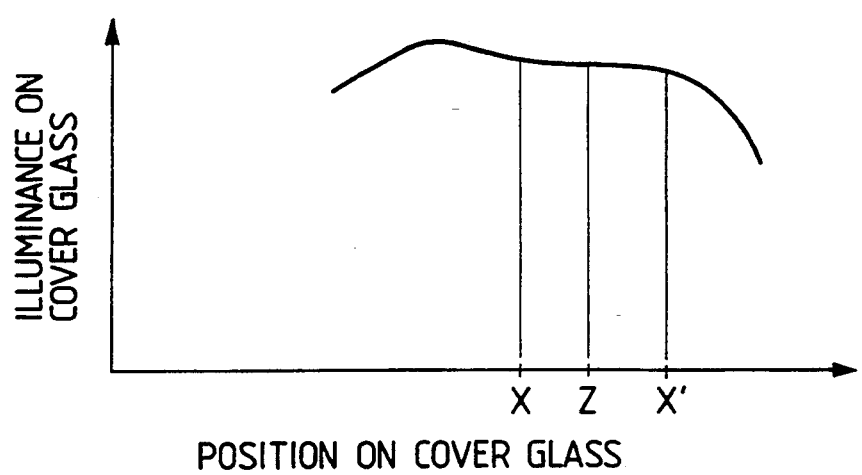
FIG. 16 is a diagram showing an illuminance distribution on a cover glass in case of using an LED having gentle directing characteristics.

In such a case, since the illuminance distribution is gentle, a high setting precision regarding the position of the optical axis Y is not required as shown in FIG. 16. An attaching margin of the LED array increases, a construction such that the system can be easily assembled is obtained.

Figure 1:
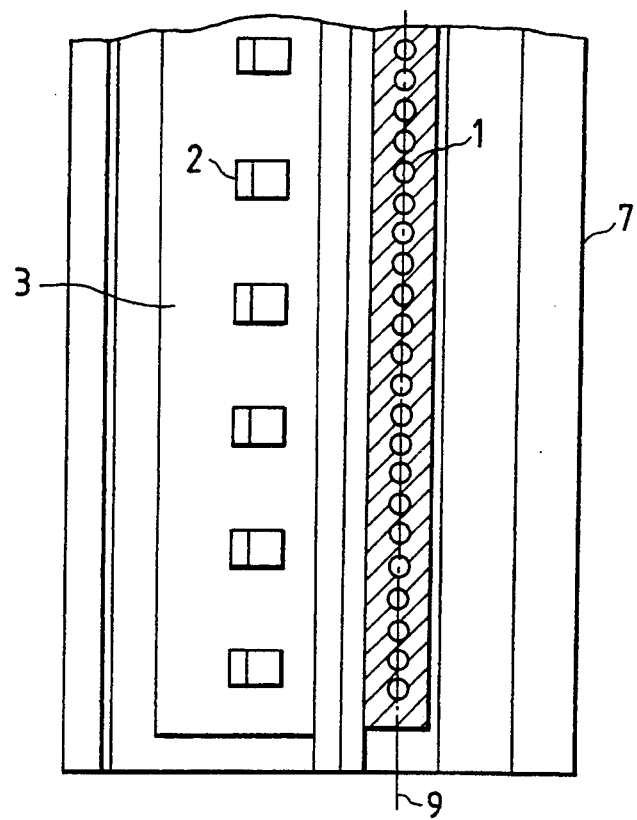
FIG. 1 is a plan view showing an example of a construction of a conventional contact type image sensor.
Figure 2:
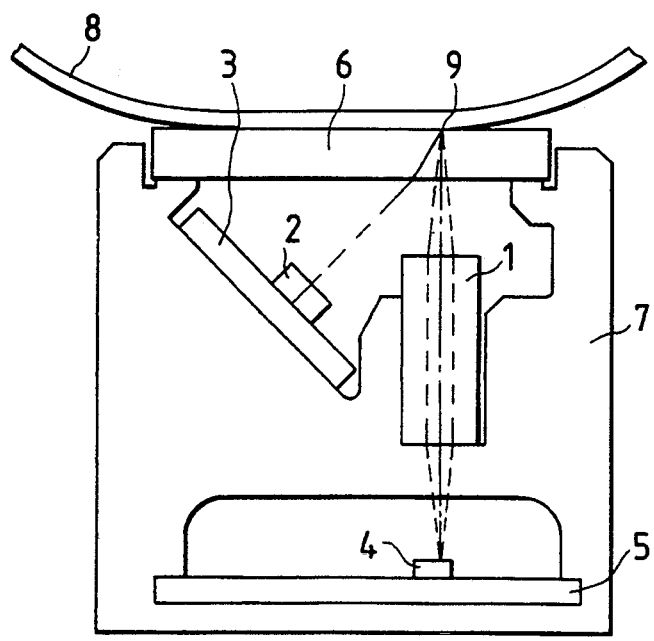
FIG. 2 is a cross sectional view of the contact type image sensor of FIG. 1.
Figure 3:
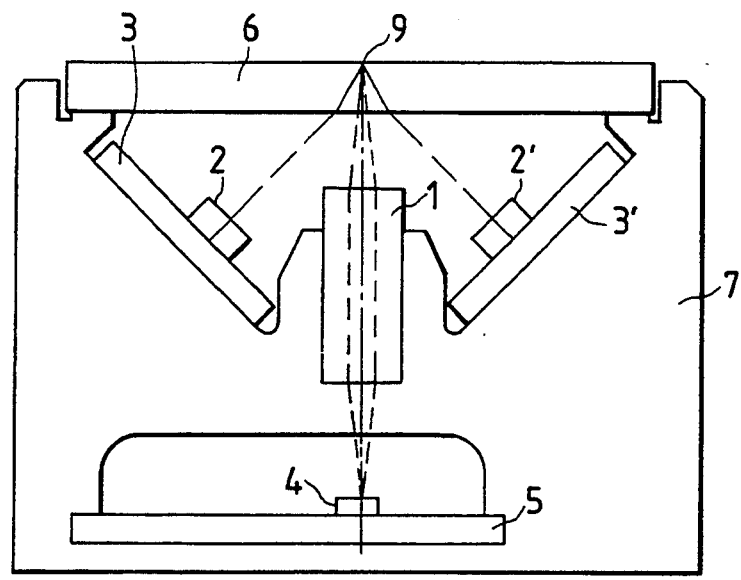
FIG. 3 is a cross sectional view showing another constructional example of a conventional contact type image sensor.
Figure 4:
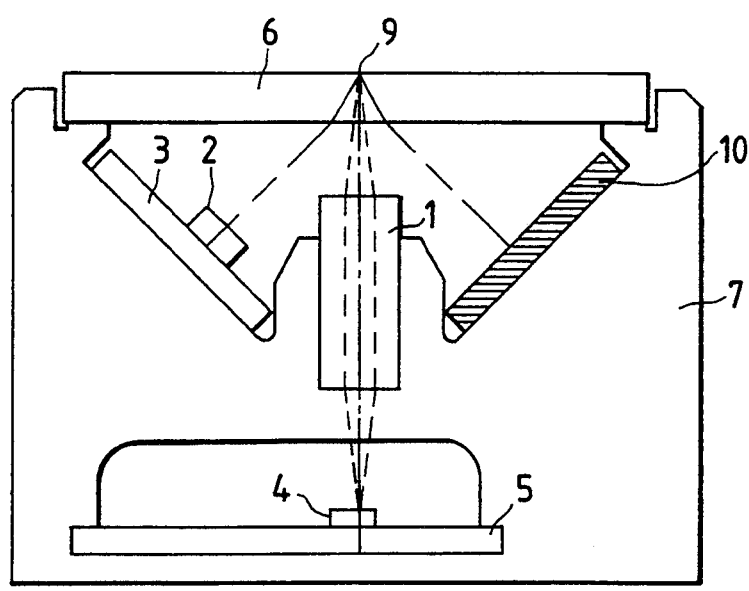
FIG. 4 is a cross sectional view showing still another constructional example of a conventional contact type image sensor.

According to the ninth embodiment of the invention as described above, in case of using the contact type image sensor using both of the direct irradiation light from the light source and the reflected light from the reflecting surface of the original supporting member, by arranging the optical axis of the illumination light from the light source to a region between the read line and the reflecting surface or onto the reflecting surface, the light amount ratio at the read line positions of both of the optical paths can be set to almost 1:1. Consequently, since the effect to erase the shadows which are formed around the concave and convex portions of the original can be maximized. The using efficiency of the light from the light source is also improved. The light amount at the read line position is doubled. The burden on the light source is decreased. Namely, the contact type image sensor of a high picture quality having substantially the same performance as that of the type using two LED arrays as shown in FIG. 3 can be realized by a smaller size and at lower costs. An electric power consumption of the light source can be also suppressed. Further, a contact type image sensor which can correspond to the driving of the sensor at a higher speed can be provided.

The above effect can be also accomplished by using a light source of an LED array or the like having gentle directing characteristics as a light source. In this case, an attaching margin of the light source increases and a construction such that the system can be easily assembled is obtained.

What is claimed is:

1. A contact type image sensor comprising:
   (a) a light source to emit a light with a predetermined inclination angle for the direction of a normal line of the surface of an original at a position of a read line;
   (b) an original supporting member for leading the light from said light source to said read line and for supporting the original;
   (c) a photoelectric converting device section for receiving the light from said original surface; and
   (d) a reflecting surface for reflecting a part of the light from the light source and for leading to said read line, in which said reflecting surface is provided for at least a part of said original supporting member locating on the side opposite to the arrangement side of the light source with regard to the read line.

2. An image sensor according to claim 1, wherein at least a part of said original supporting member is made of glass, and its boundary is used as said reflecting surface due to a difference between a refractive index of said glass and a refractive index of the air.

3. An image sensor according to claim 1, wherein an angle of said light source or/and an angle of said reflecting surface is/are set in a manner such that the incident surface of the light from said light source which enters said reflecting surface is set to an angle that is equal to or larger than a critical angle ($\theta_h$) due to a difference of a refractive index.

4. An image sensor according to claim 1, wherein said reflecting surface is polished.

5. An image sensor according to claim 1, wherein said reflecting surface is a mirror surface.

6. An image sensor according to claim 1, wherein said reflecting surface is a scattering surface.

7. A contact type image sensor comprising:
(a) a light source to emit a light to illuminate an original;
(b) an original supporting member for allowing the light from said light source to be transmitted and for supporting said original;
(c) a photosensor for converting optical information on a read line of said original supporting member into an electric signal; and
(d) a reflecting surface for reflecting a part of the irradiation light from the light source and for leading to said read line, in which said reflecting surface is provided for at least a part of said original supporting member locating on the said opposite to the arrangement side of the light source with respect to said read line, and an optical axis of the illumination light from the light source is positioned to a region between said read line and said reflecting surface or onto said reflecting surface.

8. A contact type image sensor comprising:
(a) a light source to emit a light to illuminate an original;
(b) an original supporting member for allowing the light from said light source to be transmitted and for supporting said original;
(c) a photosensor for converting optical information on a read line of said original supporting member into an electric signal; and
(d) a reflecting surface for reflecting a part of the irradiation light from said light source and for leading to said read line, in which said reflecting surface is provided for at least a part of said original supporting member locating on the side opposite to the arrangement side of the light source with respect to the read line.

wherein as said light source, there is used a light source having directing characteristics such that an illuminance on the original surface at said read line position by the light that is directly irradiated from the light source is almost equal to an illuminance on the original surface at the read line position by the light that is reflected by said reflecting surface and is irradiated.

* * * * *

UNITED STATES PATENT AND TRADEMARK OFFICE
CERTIFICATE OF CORRECTION

PATENT NO. : 5,357,099
DATED : October 18, 1994
INVENTOR(S) : MASAMI TABATA, ET AL.

It is certified that error appears in the above-identified patent and that said Letters Patent is hereby corrected as shown below:

ON TITLE PAGE

Under FOREIGN PATENT DOCUMENTS:
"58-40972  10/1983  Japan" should read
--58-40972  3/1983  Japan--.

In [57] ABSTRACT, Line 10:
"locating" should read --located--.

COLUMN 1

Line 12, "locating" should read --located--.
Line 24, "cross sectional" should read --cross-sectional--.
Line 58, "since" should be deleted.

COLUMN 2

Line 22, "an" should be deleted.
Line 28, "raised" should read --increased--.
Line 48, "locating" should read --located--.

COLUMN 3

Line 24, "locating" should read --located--.
Line 40, "locating" should read --located--.
Line 51, "gentle" should read --particular--.
Line 56, "cross sectional" should read --cross-sectional--.
Line 58, "cross sectional" should read --cross-sectional--.
Line 61, "cross sectional" should read --cross-sectional--.
Line 64, "cross sectional" should read --cross-sectional--.
Line 66, "cross sectional" should read --cross-sectional--.

UNITED STATES PATENT AND TRADEMARK OFFICE
CERTIFICATE OF CORRECTION

PATENT NO. : 5,357,099
DATED : October 18, 1994
INVENTOR(S) : MASAMI TABATA, ET AL.

Page 2 of 3

It is certified that error appears in the above-identified patent and that said Letters Patent is hereby corrected as shown below:

COLUMN 4

Line 1, "cross sectional" should read --cross-sectional--.
Line 4, "cross sectional" should read --cross-sectional--.
Line 7, "cross sectional" should read --cross-sectional--.
Line 10, "cross sectional" should read --cross-sectional--.
Line 13, "cross sectional" should read --cross-sectional--.
Line 16, "cross sectional" should read --cross-sectional--.
Line 19, "cross sectional" should read --cross-sectional--.
Line 33, "cross sectional" should read --cross-sectional--.
Line 35, "compoent" should read --component--.

COLUMN 5

Line 33, "cross sectional" should read --cross-sectional--.

COLUMN 6

Line 8, "without any click" should be deleted.
Line 14, "of" should be deleted.
Line 56, "cross sectional" should read --cross-sectional--.

COLUMN 8

Line 4, "gentle" should read --gently changing--.
Line 9, "gentle," should read --gently changing--.
Line 11, "increases, a" should read --increases and--.
Line 59, "locating" should read --located--.

COLUMN 9

Line 25, "locating" should read --located--.

UNITED STATES PATENT AND TRADEMARK OFFICE
CERTIFICATE OF CORRECTION

PATENT NO. : 5,357,099
DATED : October 18, 1994
INVENTOR(S) : MASAMI TABATA, ET AL.

It is certified that error appears in the above-identified patent and that said Letters Patent is hereby corrected as shown below:

COLUMN 10

Line 16, "locating" should read --located--.
Line 18, "line." should read --line,--.

Signed and Sealed this

Second Day of May, 1995

Attest:

BRUCE LEHMAN

*Attesting Officer*     *Commissioner of Patents and Trademarks*